May 18, 1943.  C. E. LINDEN ET AL  2,319,551
HYDRAULIC OPERATING AND CONTROL MECHANISM FOR MACHINE TOOLS
Filed Aug. 9, 1937   11 Sheets-Sheet 8

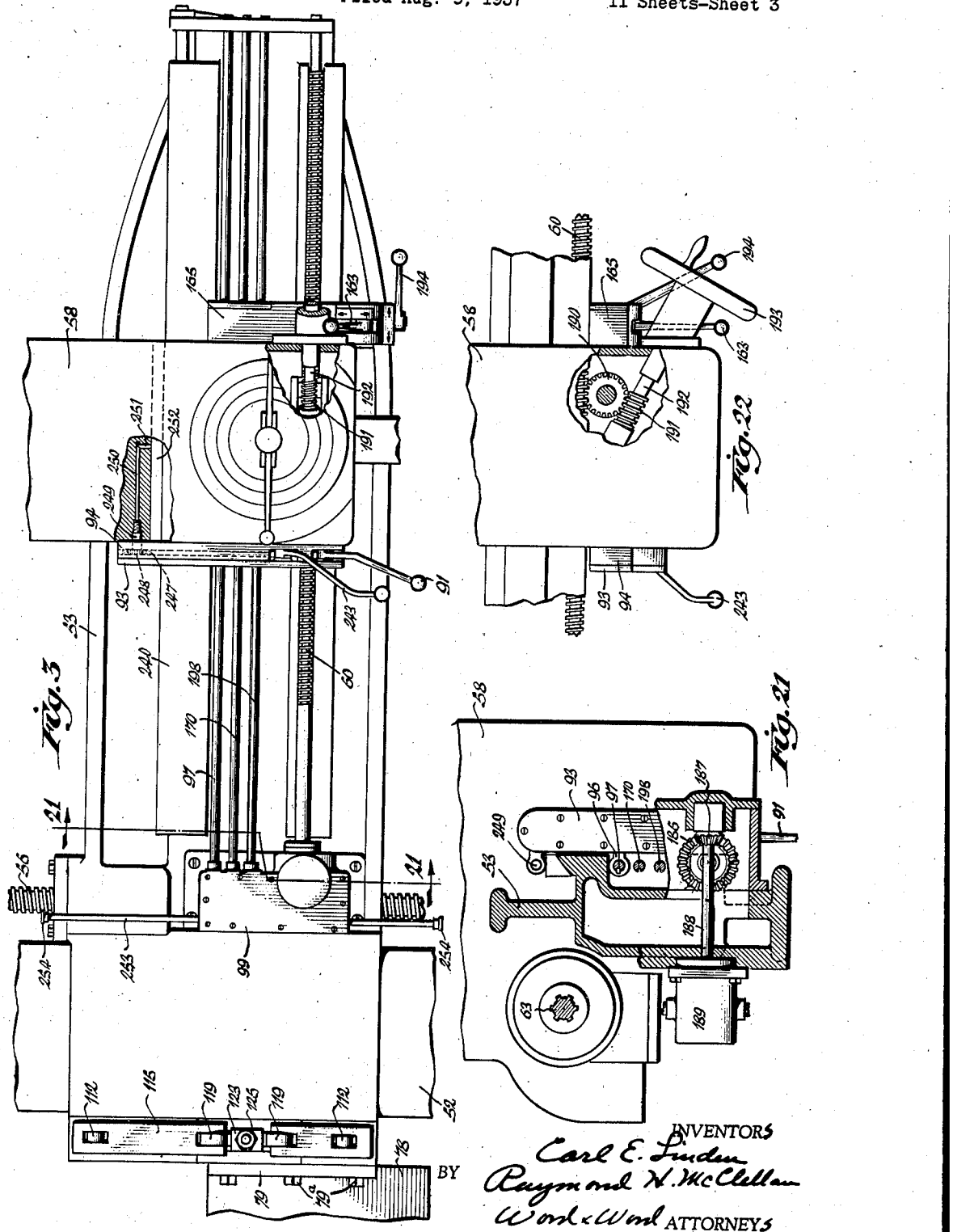

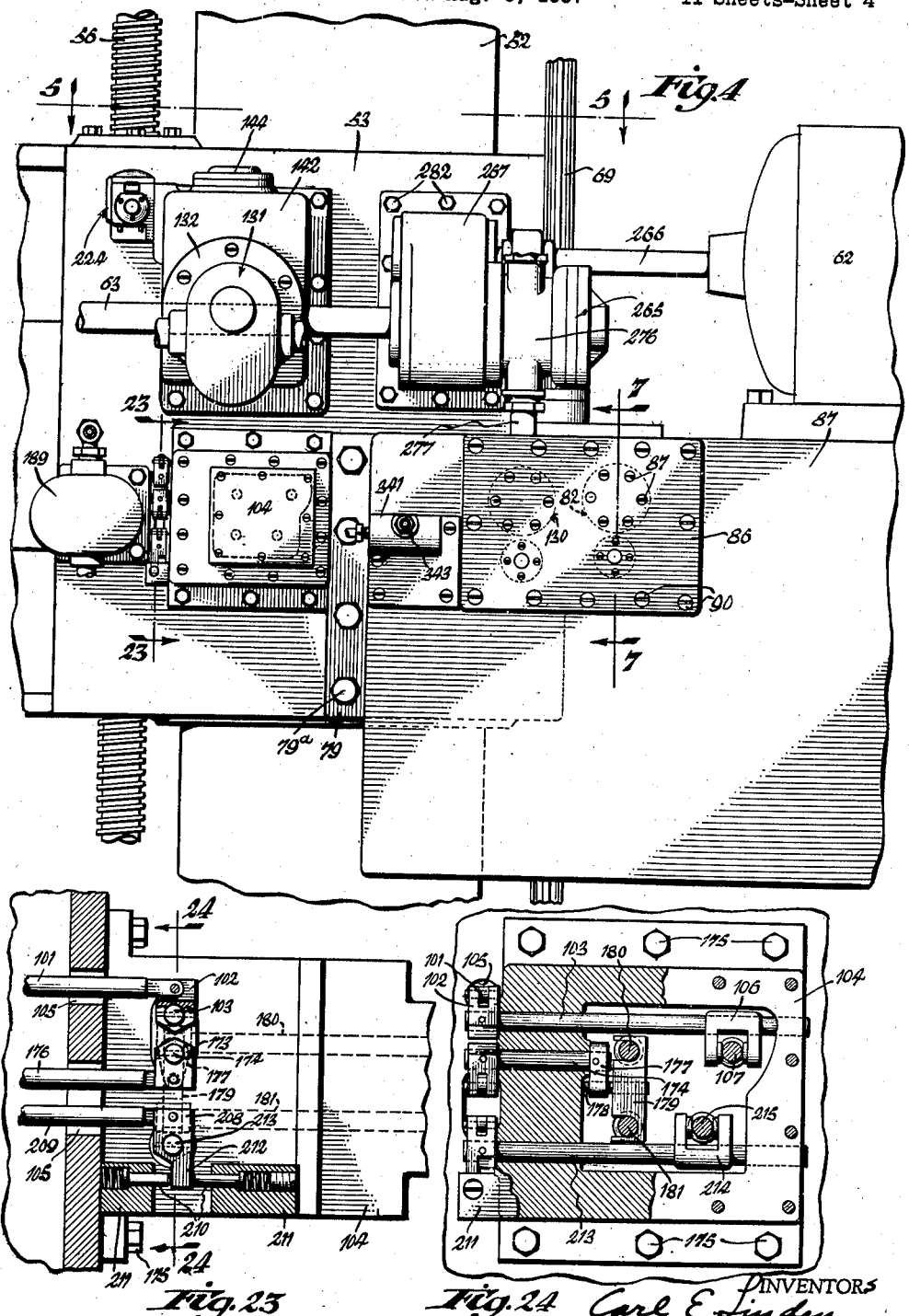

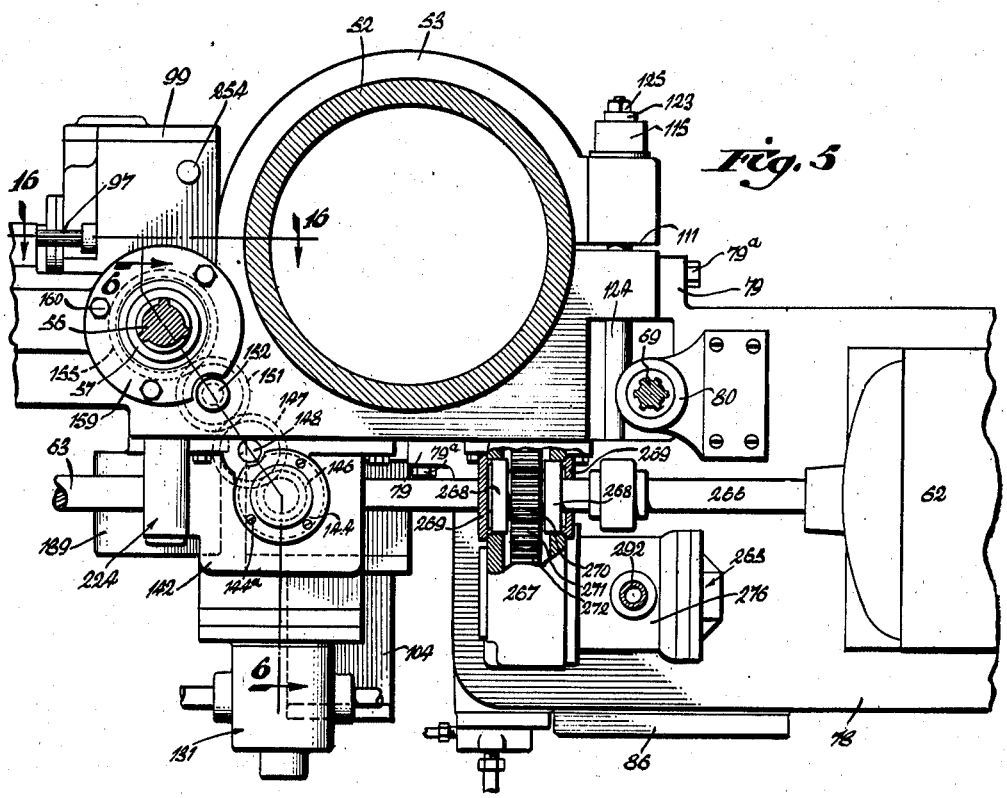
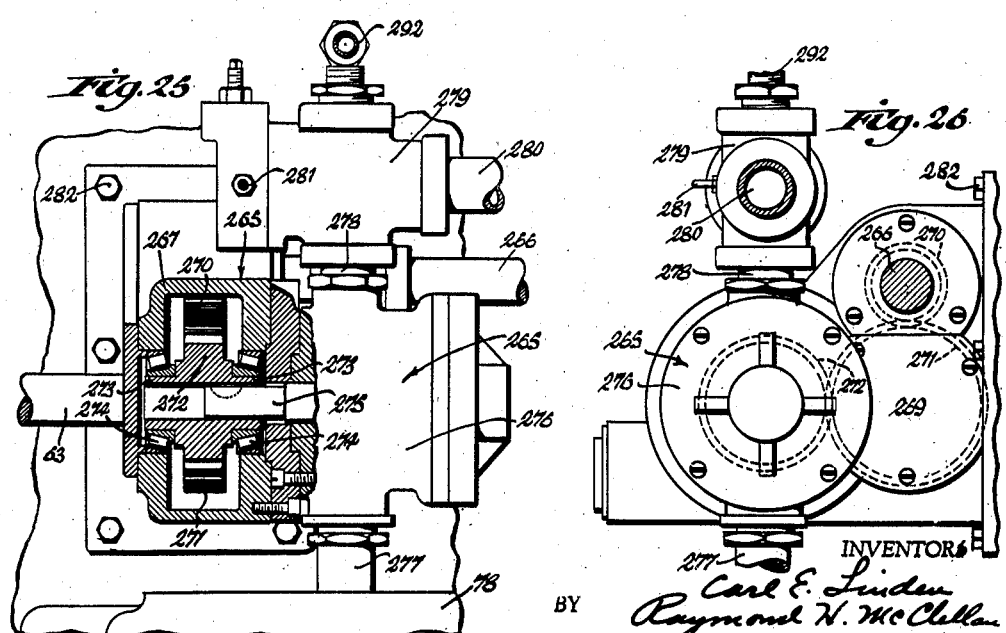

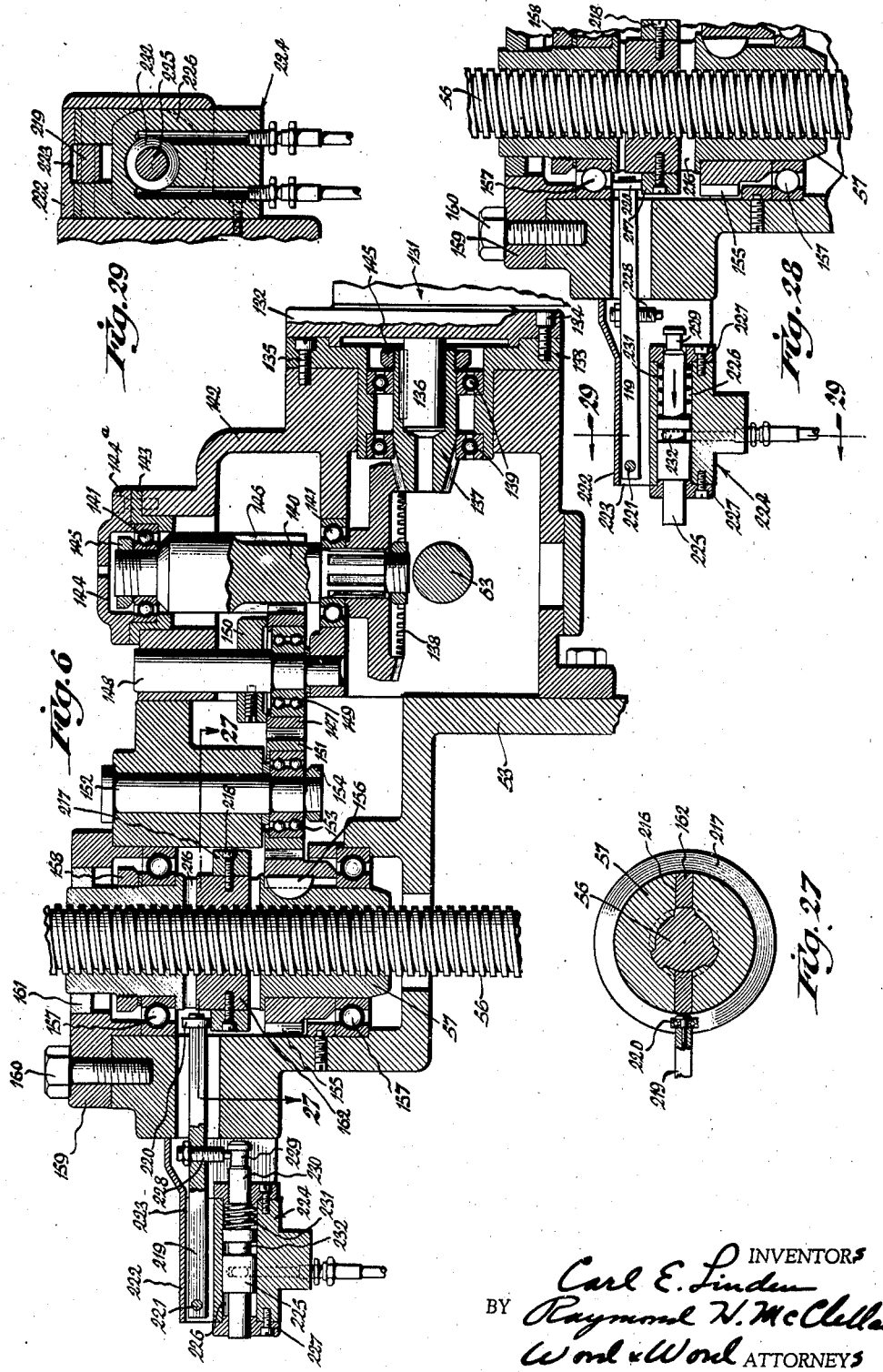

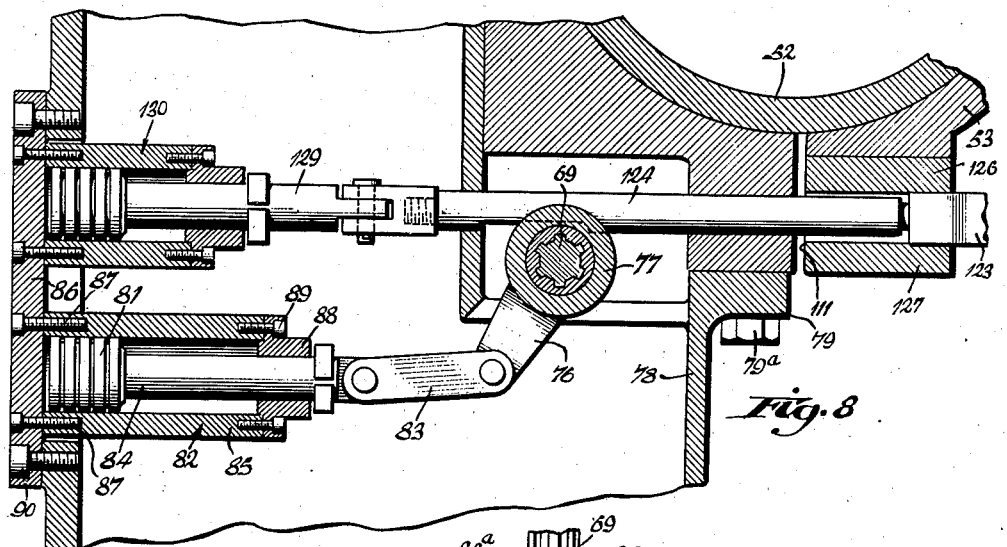

INVENTORS
Carl E. Linden
Raymond W. McClellan
BY
Wood & Wood  ATTORNEYS

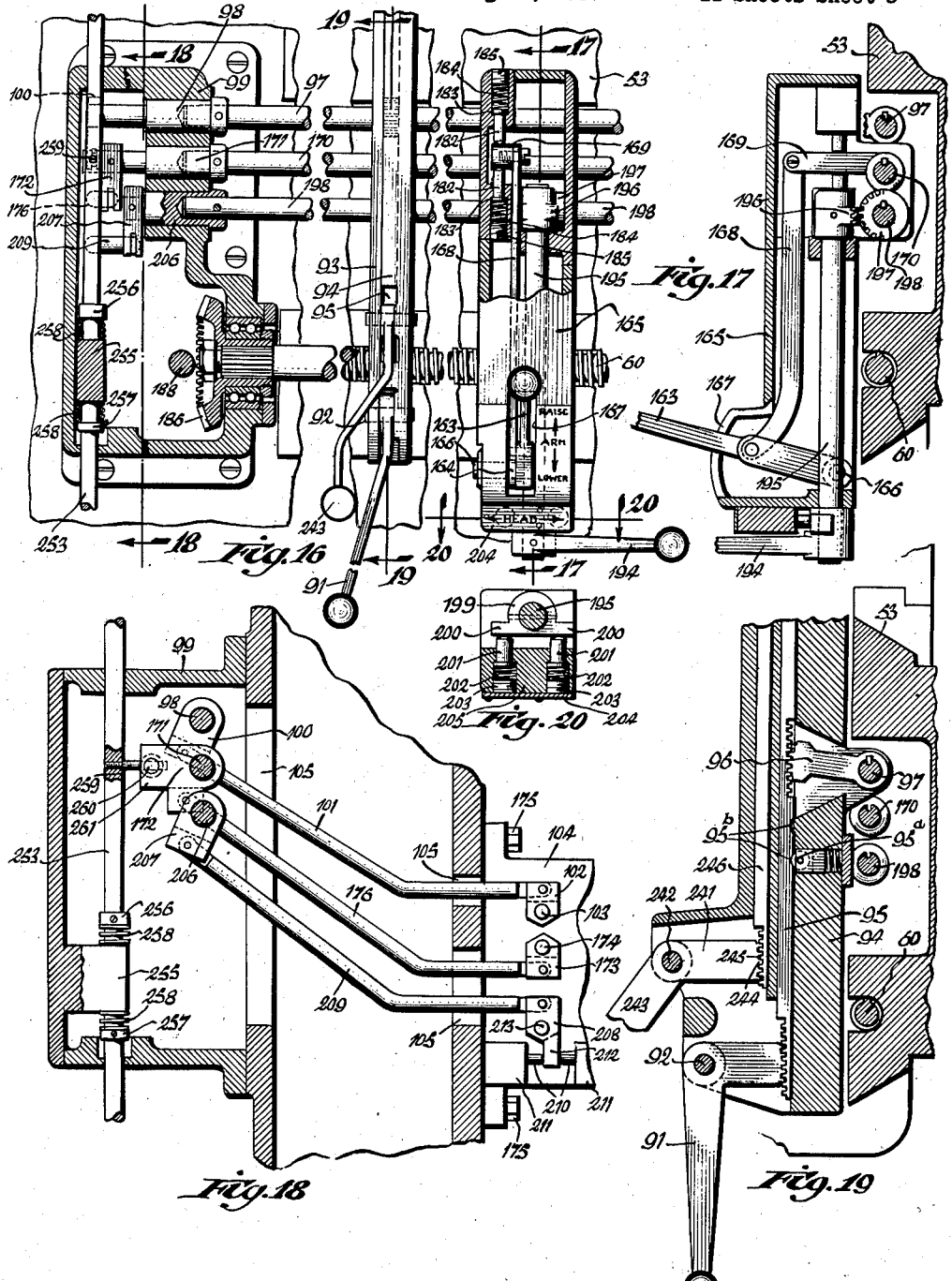

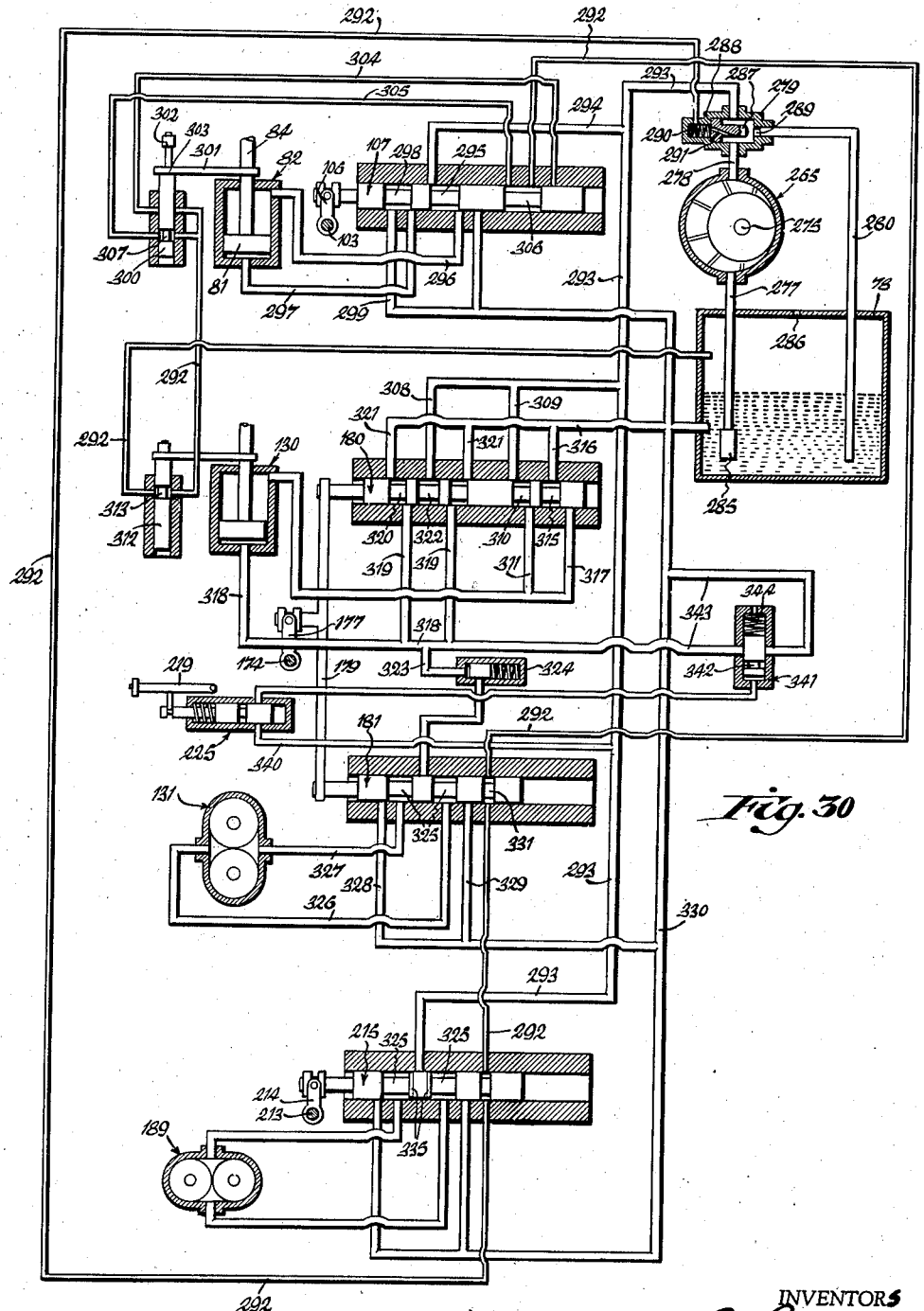

May 18, 1943.  C. E. LINDEN ET AL  2,319,551
HYDRAULIC OPERATING AND CONTROL MECHANISM FOR MACHINE TOOLS
Filed Aug. 9, 1937  11 Sheets-Sheet 11
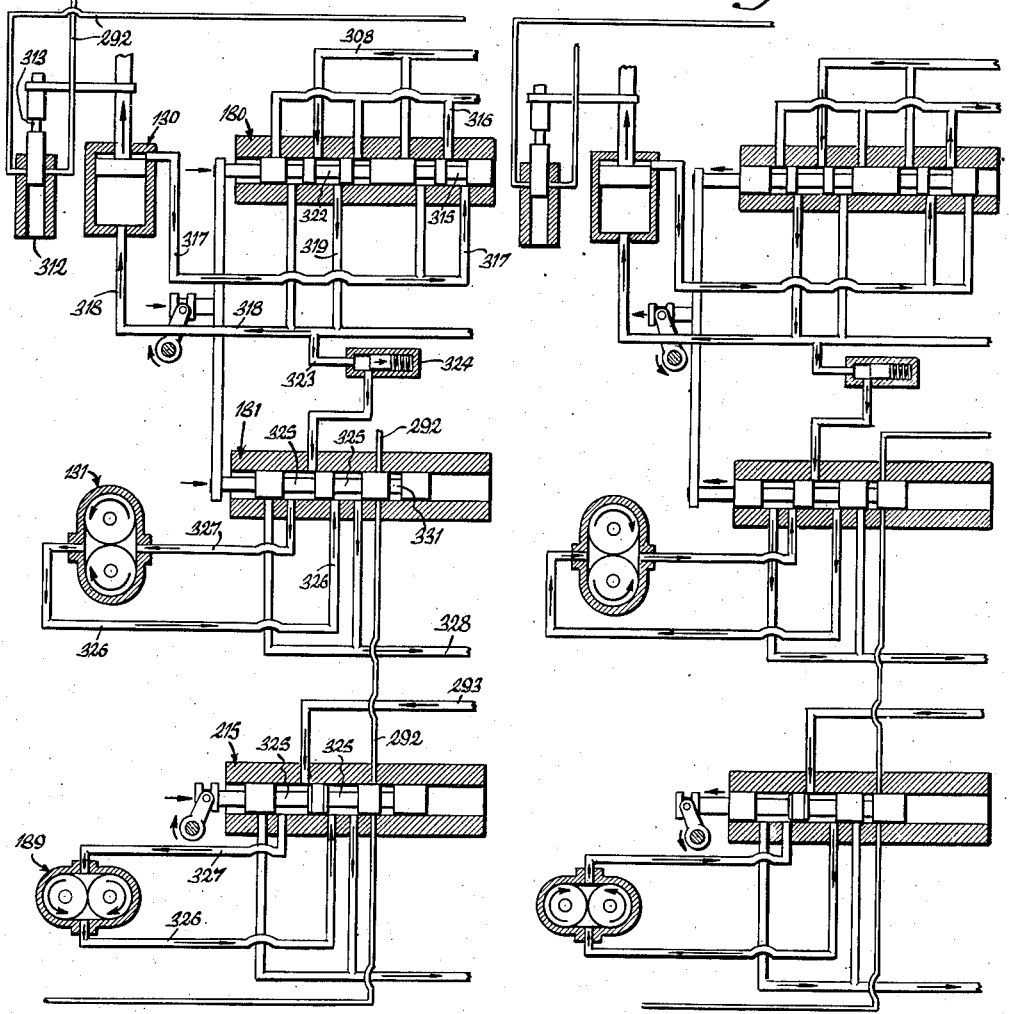
INVENTORS
Carl E. Linden
BY Raymond N. McClellan
Wood & Wood ATTORNEYS Patented May 18, 1943

2,319,551

UNITED STATES PATENT OFFICE 2,319,551

HYDRAULIC OPERATING AND CONTROL MECHANISM FOR MACHINE TOOLS

Carl E. Linden, Norwood, and Raymond H. McClellan, Hamilton, Ohio, assignors to The Fosdick Machine Tool Company, Cincinnati, Ohio, a corporation of Ohio Application August 9, 1937, Serial No. 158,070

27 Claims. (Cl. 77—28)

This invention relates to machine tools and is particularly directed to radial drills. More particularly the improvements concern the application of hydraulics to the control and operation of a radial drill or any machine tool embodying structure to which the hydraulic system of the present invention may find application.

In the conventional drill, a base is provided incorporating a stump upon which stump a column is rotatably mounted. An arm is mounted on the column and projects radially therefrom carrying a drill head movable along the arm whereby as a result of the rotatable movement of the arm and the traversing of the head, the drill may be positioned as desired with respect to the work mounted on the base. The arm is raised or lowered to position, approximately at the correct elevation and thereafter the drill is fed and rotated from a drive transmission within the head.

The column is fixed or clamped upon the stump by means of a column clamp and the arm clamped upon the column by means of an arm clamp. A driving mechanism is provided for raising or lowering the arm through the medium of either a rotating screw and a fixed nut or a fixed nut and a rotating screw. The head is moved along the rail of the arm either by power means or by manual means. It has been conventional to provide some type of safety nut associated with the elevating mechanism for controlling the arm movement so as to prevent falling thereof in case the nut or screw threads are stripped.

It has been the object of the present invention to provide a radial drill of this character in which the arm is raised and lowered, the head is traversed, the column is clamped and/or the arm is clamped by fluid pressure.

It has been a further object to provide a hydraulically operated and controlled radial drill which incorporates a safety nut associated with the elevating nut effective for controlling the hydraulic system toward the end that operation of the elevating mechanism is impossible if the threads are worn to a dangerous degree and which prevents unclamping of the arm following the safety operation of the nut.

It has been the further object of the present invention to provide a hydraulic system for controlling and operating the moving parts of a radial drill in which the fluid pump is constantly driven as long as the main motor of the radial drill is operated and to this end bypassing the discharge of the pump so that it does not operate against a head pressure of any sort, including for this purpose a secondary control circuit altered by the manipulation of any of the levers controlling any of the movements for causing the pump to deliver a fluid pressure into the system sufficient for the operations intended.

It has been the further object of the present invention to provide for the control of the arm clamp and arm elevating mechanisms through the same lever wherein the system is effective for causing unclamping of the arm in advance of elevating movement of the arm or, vice versa, bringing about this result through the interpositioning of devices in the system automatically set in motion by the movement of the lever to either arm raising, or arm lowering position.

It has been the further object of the present invention to provide an arrangement of the hydraulic control and operating units whereby they may be conveniently and quickly removed from the machine and in the case of the clamping motors and their attendant valves providing an association of these parts and valves as a unit in the reservoir, eliminating certain of the conduits by having the parts directly within the reservoir.

It has been a further object of the present invention to incorporate an automatic stop mechanism associated with the arm for terminating raising or lowering motion of the arm within certain limits, this stop mechanism being effective upon the hydraulic control mechanism for the arm elevating hydraulic motor.

It has been a further object of the present invention to improve the general arrangement of the hydraulic control system toward the end of simplifying the same and rendering it more efficient and more easily assembled.

These objectives have been achieved, the hydraulic control and operating mechanism herein disclosed being exemplary of apparatus which is within the concept of the present invention.

Other objects and certain advantages will be more fully apparent from a description of the accompanying drawings, in which:

Figure 3 is a fragmentary enlarged view looking toward the front of the arm, portions of the head being broken away for illustrating certain of the details thereof.

Figure 4 is a fragmentary view of a portion of the arm illustrating certain units of the mechanisms adjacent to the column such as the pumping unit, the valve unit and the hydraulic motor units.

Figure 5 is a sectional view taken on line 5—5, Figure 4, further showing the structure of the arm around the column.

Figure 6 is a sectional view taken on line 6—6, Figure 5, illustrating the transmission extending from one of the hydraulic motors to the elevating nut.

Figure 7 is a sectional view taken on line 7—7, Figure 4, showing the column clamp operating motor and valve.

Figure 8 is a sectional view taken on line 8—8, Figure 7, illustrating the hydraulically operated motors for operating the column clamp and the arm clamp.

Figure 9 is a sectional view taken on line 9—9, Figure 7, showing the further details of the operating motors for the column and arm clamps.

Figure 10 is a sectional view taken on line 10—10, Figure 9, showing further details of the motors particularly the control valves thereof.

Figure 11 is a view taken similar to Figure 10, illustrating the valves reversed by operation of the respective motors to the unclamping position.

Figure 16 is a fragmentary condensed partially sectional view looking toward the front of the arm and detailing the extension of the various control means from the head along the arm to the region of the column.

Figure 17 is a sectional view taken on line 17—17, Figure 16, illustrating in detail the control levers at the head for controlling the elevating nut and arm clamp control lever and the head traverse motor control lever.

Figure 18 is a sectional view taken on line 18—18, Figure 16, illustrating the connections between the control rods to the valve unit at the rear of the arm.

Figure 19 is a sectional view taken on line 19—19, Figure 16, detailing the control levers on the head for mechanically locking the head in position and for controlling the hydraulic motor operating the column clamp.

Figure 20 is a sectional view taken on line 20—20, Figure 16, showing the device for maintaining the head traverse control lever in neutral.

Figure 21 is a sectional view taken on line 21—21, Figure 3, illustrating the hydraulic motor and transmission for traversing the head.

Figure 22 is a fragmentary top plan view of the arm showing a portion of the head and illustrating the hand traverse for the head.

Figure 23 is a sectional view taken on line 23—23, Figure 4, illustrating the connection of the control linkages to the valve unit.

Figure 24 is a sectional view taken on line 24—24, Figure 23, showing in detail the connections of the control linkages into the valve unit.

Figure 25 is a fragmentary partially sectional view enlarged out of Figure 4 and illustrating part of the transmission connecting the power to the pump.

Figure 26 is an end view of Figure 25 further illustrating the transmission to the pump.

Figure 27 is a sectional view taken on line 27—27, Figure 6, showing the safety nut associated with the elevating nut and its connection to the hydraulic means.

Figure 28 is a sectional view taken from a portion of Figure 6 showing the safety nut in operative position after being released by predetermined wear of the nut threads, the valve thereupon bypassing the oil supply to the elevating motor and rendering it inoperative and also, after release and return of control lever to neutral locking arm clamp in position.

Figure 29 is a sectional view taken on line 29—29, Figure 28, further illustrating the safety nut operated valve.

Figure 30 is a diagrammatic view illustrating the hydraulic circuits and the various devices utilized in the present system for operating the column clamp, arm clamp traversing the head, and elevating the arm, the system being shown in neutral position.

Figure 31 is a diagrammatic view illustrating the system by showing the various valves in position for causing operation of the respective control motors; in other words, releasing the clamps, moving the arm and traversing the head.

Figure 32 is a diagrammatic view of the system showing the various control valves reversed from the positions shown in Figure 31 for driving the head in a reverse direction and changing the direction of the elevation of the arm.

Figure 1:
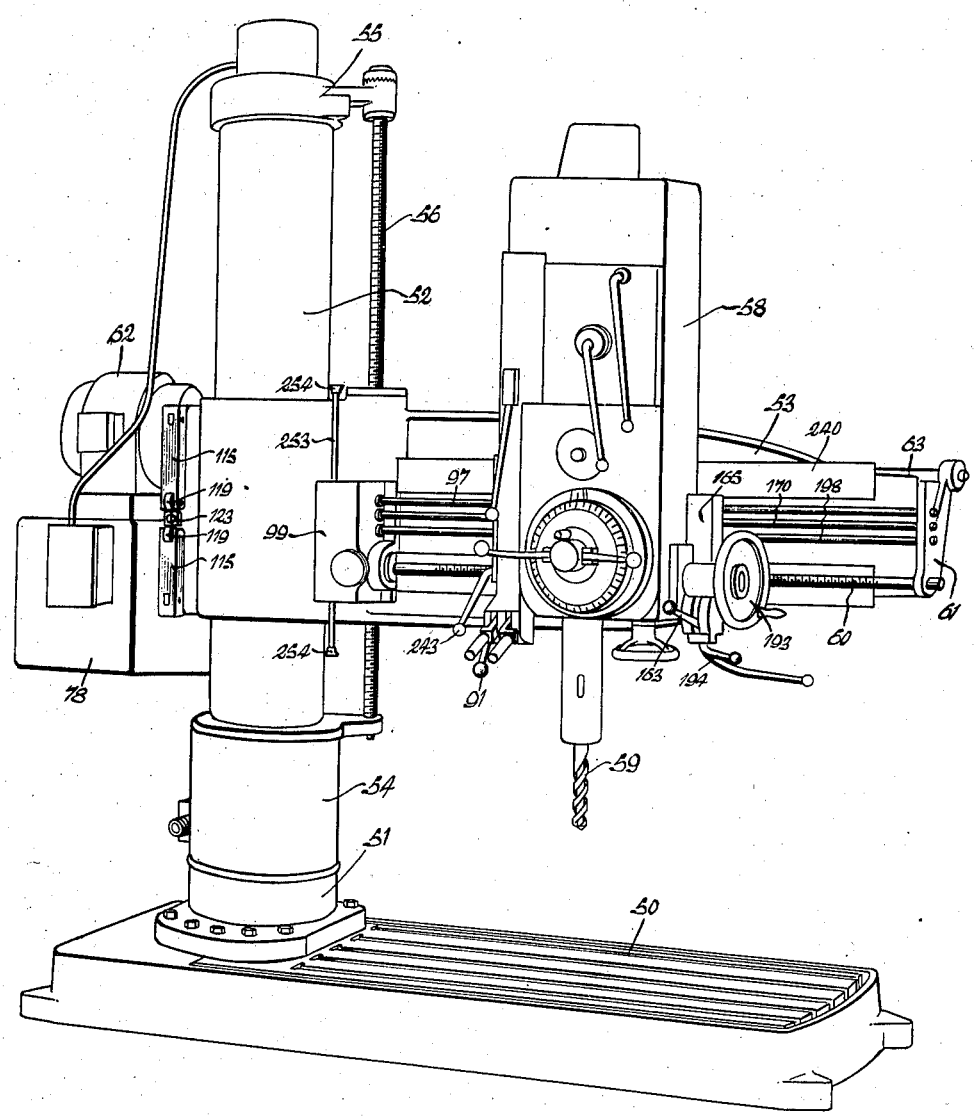
Figure 1 is a perspective view looking toward the front of a radial drill incorporating the hydraulic mechanisms of the present invention.
Figure 2:
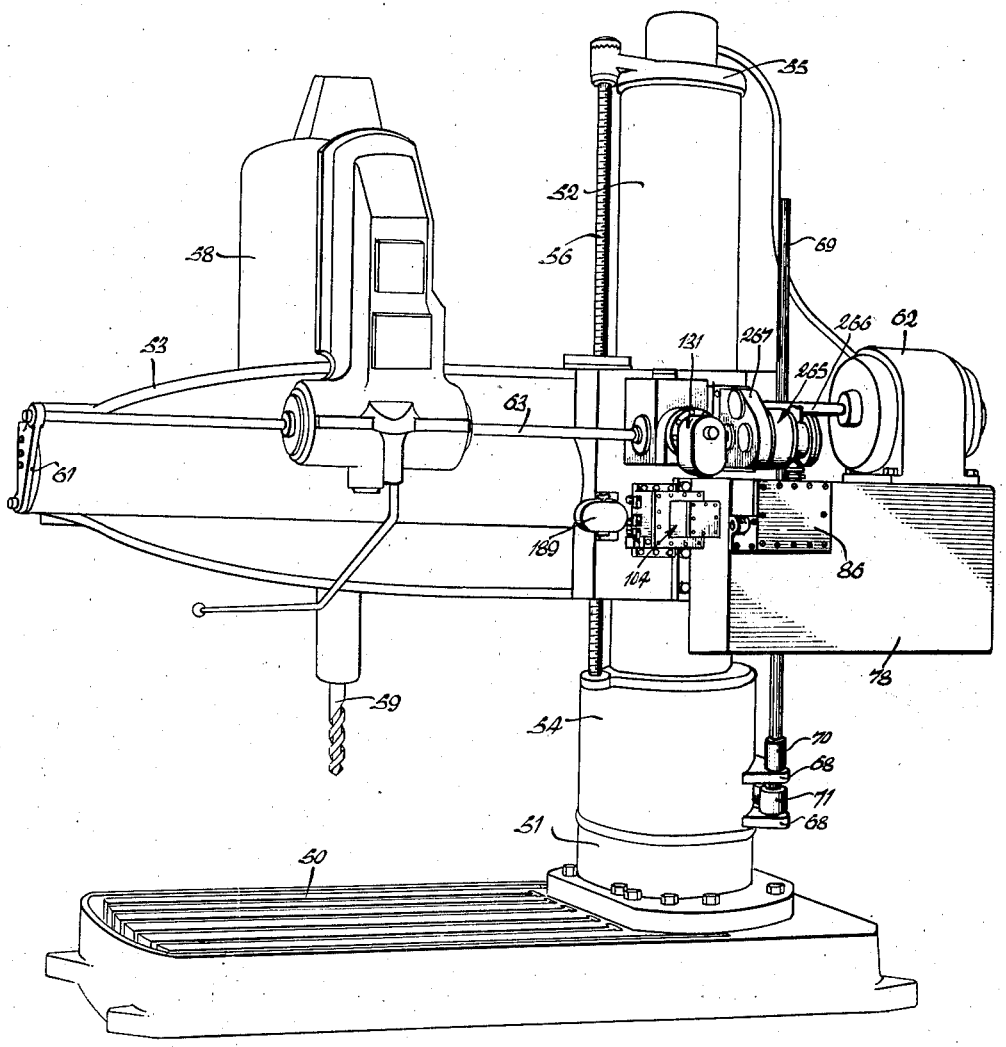
Figure 2 is a perspective view looking toward the rear of the radial drill.

The present improvements have been incorporated in a radial drill having the conventional major elements or parts. In certain of the general views, the hydraulic system has been omitted, that is, with respect to piping. The conduit connections between the various elements and units of the hydraulic system are fully illustrated in the diagrammatic views. To simplify the illustration, only the mechanical control apparatus and connections are shown in the detailed views.

Toward the end of presenting the subject matter of the invention in orderly fashion, the description will proceed first with an outline of the major parts of the radial drill, then with respect to the mechanical units operated by the hydraulics such as, the column clamp, the arm clamp and elevating mechanism, and the head traverse. The description in each instance will proceed to the control levers for these various units and will trace the respective control connections through, in the order named, to a valve unit.

The circuits will then be described for an understanding of the method of providing and distributing the fluid pressure. The description of the hydraulics will include a description of the safety nut operating a hydraulic control for automatically discontinuing the operation of the elevating nut in the event that the screw threads of the nut are in badly worn condition where there is danger of the arm falling. In the final consideration, the operation of the system will be set out.

*General description of the environment of the invention*

The radial drill to which these improvements are applied, is to the major extent, a conventional structure. It includes a base 50, including a stump 51, rotatably supporting the column 52. The column carries an arm 53 extending radially therefrom and slidable up and down on the main portion of the column. The column includes a base portion 54 in which the column clamp is incorporated. A cap 55 is provided at its upper end. Between the cap and the base portion, a stationary screw 56 is disposed in a parallelism with the column passing through the arm and engaged by an elevating nut 57.

The arm carries a drill head unit 58 including a driving mechanism for driving a chuck in which a drill 59 is engaged. At this point it is pointed out that it is unnecessary to discuss the details of the mechanism within the head for driving the drill, since the present invention only pertains to the head insofar as the control levers are associated therewith or insofar as the head is traversed hydraulically.

For the purpose of traversing the head, a screw 60 is disposed along the arm and passes through the head. The screw has its outer end journalled in a bracket 61 at the outer end of the arm and its inner end extended into a casing adjacent the column where it is in transmission connection with a hydraulic motor. The arm extends away from the column opposite the drill head carrying portion to provide a support for the electric motor 62. The motor 62 not only drives the mechanism within the head, but drives the hydraulic pump by means of which all of the remainder of the mechanism which is hydraulic in this case is driven and operated. In other words, it may be said that the motor shaft is connected for two major functions. The first is to drive the shaft 63 along the back of the arm which passes through the head and connects to the mechanism therein for rotating and feeding the drill. The second is to drive the pump shown in Figure 4 and detailed in Figures 25 and 26.

The arm is equipped with a clamping mechanism effective for drawing together the portions of the arm encircling the column at either side of a split, this, of course, being conventional.

Column clamping mechanism

Figure 15:
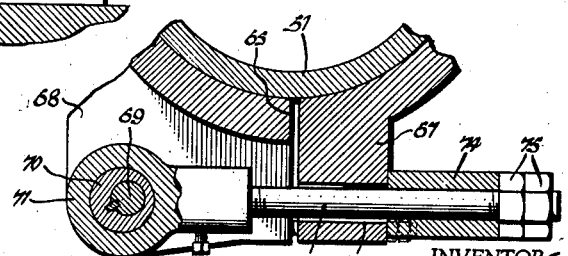
Figure 15 is a sectional view taken on line 15—15, Figure 12, detailing the column clamp.

As has been stated previously, the column includes a base portion 54. This is seen in detail in Figures 12 and 15. This base portion fits over the stump 51 and is rotatable thereon. The base is split longitudinally from its lower edge upwardly, this split 65 joining a circumferential split 66 extending partially around the base of the column. This provides flexible portions encircling the stump and separated by the split 65. One of these portions has an outwardly projected lug 67 and the other has a pair of spaced horizontally disposed lugs 68. A splined shaft 69 is disposed vertically being mounted in the lugs 68 and projecting upwardly through the arm. The lower end of this shaft 69 has a cam 70 keyed thereto. The cam includes hubs extending into and journalled to the lugs 68, the cam portion extending between the lugs. The cam portion traverses a yoke 71 adjustably fixed by screw threading on the end of a clamping rod 72 traversing a clearance bore 73 in the lug 67 across the split 65. A thrust sleeve 74 is disposed on the clamping rod against the opposite side of the lug 67 and is held thereagainst by a pair of nuts 75 screwed on the outer end of the rod against the thrust sleeve 74. Accordingly, within a certain range of rotation, the cam is effective for drawing the portions of the base of the column together upon the stump.

The shaft 69 which rotates the cam is splined through an arm 76 (see Figures 7 and 8). This arm 76 is sustained on the arm of the drill in the following manner. The arm 76 includes an upwardly extended sleeve traversing a supporting bushing 77 disposed through an aperture in the tank casing 78 mounted on the arm of the drill and attached thereto by means of a flange 79 secured by screws 79a. This tank 78 contains the oil used in the hydraulic system. The upper end of the sleeve projecting above the supporting bushing is encircled by a collar 80 fixed thereto by means of a set screw 80a. Thus, this operating arm 76 carried by the arm of the drill, is free to slide up and down on the splined shaft and at the same time is connected rotatably thereto.

The arm is connected to the piston 81 of the clamping motor 82 by means of a link 83 attached by pins to the end of the arm and to the end of the piston rod 84. The motor cylinder consists of a sleeve 85 having its forward end closed by abutment against a plate 86. The sleeve is held in this position by screws 87. Its rear end is closed by means of a head 88 secured in position by means of screws 89.

The plate 86 carries the operating motors or devices and certain of the control valves for both the column clamp and the arm clamp. This plate is fixed in position over an opening in the casing 78 by means of screws 90. Thus a convenient arrangement is provided for removing the clamping motors and valves as a unit. Inasmuch as the remainder of the operating structure is purely hydraulic with the exception of the control leverage, the description will now be directed to the control for this clamp.

Column clamp control leverage

The column clamp is controlled from the drill head by means of a lever 91. The lever 91 (see Figures 16 and 19) is fulcrumed on a pin 92 disposed between the plate sections 93 and 94 making up a housing for the operating parts of this lever and the lever for mechanically locking the head in position. One of the plates is slotted to receive the lever on the pin 92. The lever depends vertically and has its operating knob disposed below the head adjacent the drill for convenient access. The lever may be described as a bell-crank lever and has its operating arm in the form of the segment of gear teeth, which teeth are engageable with the teeth of a rack bar 95 disposed in a slideway formed between the plates 93 and 94. A detent 95a is mounted in one of the plates and engages either one of a pair of detent grooves 95b in the bar 95 for determining clamped or unclamped position of the lever.

Additional teeth are formed on the plate on its opposite side and these teeth are engaged by teeth on the end of an arm 96 fixed to the control rod 97. The control rod 97 has its outer end journalled for rotation in the bracket 61 of the radial drill arm and its inner end pinned and socketed in a stub shaft 98 journalled in the wall of the casing 99. The casing 99 forms a juncture box in which the leverages are directed to the rear of the arm.

A bifurcated arm 100 is fixed to the stub shaft 98 within the casing and is connected by a rod 101 to another bifurcated arm 102 fixed on the outer end of a yoke shaft 103 journalled in the walls of, and disposed across the valve unit 104.

The rod 101 passes through slots 105—105, in the back and front walls of the arm adjacent the column. A yoke 106 is fixed on the shaft 103 within the casing to the column valve clamp control unit, the yoke having the usual grooved connections of the valve 107. The valve 107 is appropriately connected by oil conduits to the motor 82 previously described as well as to other units of the system in accordance with the diagrams which will hereinafter be described.

Arm clamp

Figure 12:
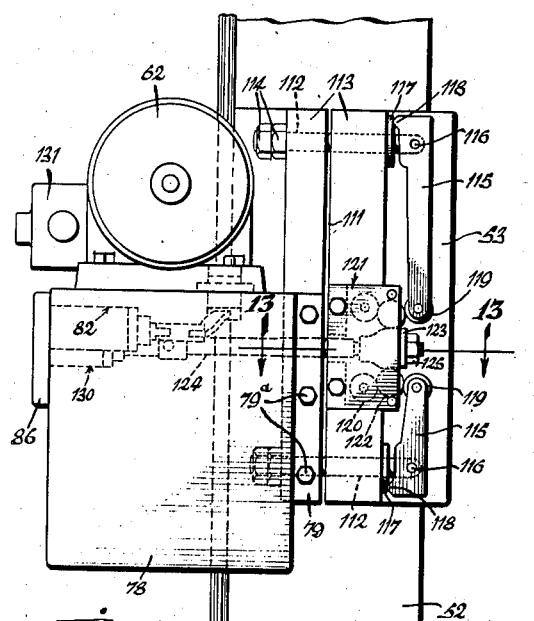
Figure 12 is a fragmentary side view of the radial drill looking toward the motor support end of the arm and illustrating the arm and column clamps.
Figure 14:
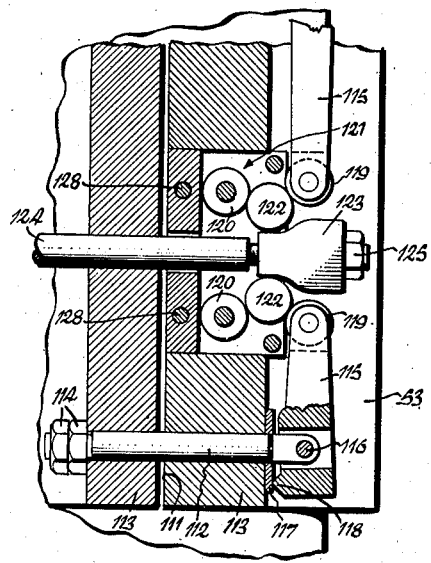
Figure 14 is a sectional view taken on line 14—14, Figure 13, showing in enlarged detail the mechanism of the arm clamp in released position.
Figure 13:
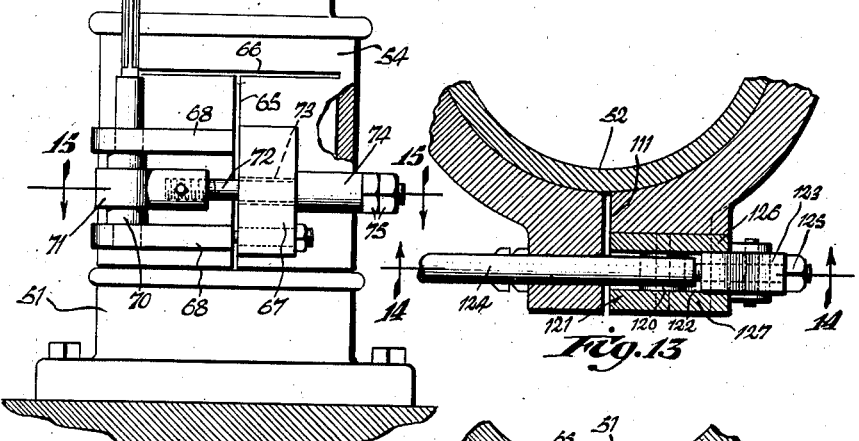
Figure 13 is a fragmentary sectional view taken on line 13—13, Figure 12, showing details of the arm clamp.

The arm clamp is generally illustrated in detail in Figures 12 to 14. That portion of the arm 53 which encircles the column is split longitudinally of the column as at 111, this being conventional. A pair of drawbolts 112 traverse flanges 113 at the respective sides of the slot. Adjustable heads are provided on these draw bolts in the form of nuts 114 at the outer ends thereof. The inner or actuated ends of the draw-bolts are connected respectively to wedging levers 115 by means of cross pins 116. Surrounding these draw-bolts and lying against the flange 113 are thrust washers 117. The outer ends of the wedging levers include cams 118 on their outer ends having rounded contact portions engaging the thrust washers 117.

The adjacent ends of the arms 115 are actuated for drawing the bolts through a compressing action between the outer ends of the levers and the nuts 114, 114 tending to wedge the split portions of the arm together on the column. To this end the adjacent ends of the arm carry rollers 119. Other rollers 120 are journalled within a wedging unit 121 fixed in a notch in the flange 113. The unit 121 carries rollers 122 loosely disposed between the rollers 119 and 120 and urged therebetween, as shown in Figure 12, by means of a wedge 123. The element 123 is fixed on the end of a translatable operating shaft 124 by means of a nut 125. The unit 121 consists of plates 126—127 providing a slot therebetween for housing the rollers and wedge. These plates are held on the flange 113 by screws 128. The shaft projects slidably through the other flange 113 as shown in Figure 8 and is attached to the outer end of the motor shaft 129.

The hydraulic motor 130 is of the same structure as the motor 82, and further description thereof is unnecessary.

Elevating nut drive

A hydraulic motor 131 is provided (see Figure 6) for driving the elevating nut 57. Any type of hydraulic motor may be used which will impart a rotary motion. The motor body or casing 132 is fixed to a bearing sleeve element 133 by means of screws 134. Both the casing and the sleeve include flanges which are superimposed, the flange of the bearing sleeve 133 being fixed to the arm by means of screw 135.

The shaft 136 of the motor is in keyed connection with the hub of a pinion gear 137, meshing with a gear 138. The gear 137 is suitably journalled in the bearing sleeve by means of ball bearings 139. A gear 138 is fixed on the end of a transmission shaft 140 journalled in ball bearings 141 within the casing 142 fixed to the arm. For purposes of attachment and assembly, the outer bearing 141 is secured between a pair of elements, namely, a bearing sleeve 143 and a cap 144, the respective flanges of which are joined to the casing 142 by screws 144a. In the instance of both the gear 138 and the shaft 140, these elements are secured in position by means of a nut 145 engaging one bearing and drawing the gear or gear portion against the other bearing.

From the shaft 140 the drive is transmitted by means of gear teeth 146 formed in the shaft in mesh with a gear 147. The gear 147 is loosely journalled on a shaft 148 on a ball bearing 149. The shaft 148 is fixed in position against rotation and the gear is held against the ball bearings including for this purpose an overhanging flange engaging the ball bearings, by means of a collar 150 fixed to a shaft.

The gear 147 meshes with another gear 151 loosely rotatably journalled on a shaft 152 fixed in a wall of the arm. A bearing 153 supports the gear on the shaft. The gear is fixed on the outer race of the bearings and the inner race is held against a shoulder of the shaft by means of the nut 154. The gear 151 meshes with a gear 155 fixed to the elevating nut 57 by means of a key 156.

The nut 57 is in the form of a sleeve, providing considerable threaded bearing on the stationary screw 56. It is mounted for rotation on ball bearings 157—157 fixed in the arm and at the respective ends of the nut. A nut 158 is screwed on the upper end of the elevating nut and engages the upper bearing against a shoulder of the elevating nut, and the driving gear 155 against the lower bearing, the engagement being with the inner races of the respective bearings. The driving gear lies against a shoulder of the elevating nut.

A cap member 159 is held against the top of the arm by means of screws 160 including an inwardly extended annular flange engaging the outer race of the upper ball-bearing. This cap carries a sealing ring 161 surrounding the upwardly extending end of the elevating nut.

A safety nut 162 is associated with the elevating nut and is effective for operating a hydraulic control mechanism. In the event that the threads of the nut become worn, to an unsafe degree, the safety nut will cause the hydraulic system to operate in such a manner as to render inoperative the elevating nut driving means and to guarantee the reclamping of the arm and thereafter preventing unclamping of the arm clamp or operation of the elevating nut.

Arm clamp and elevating nut drive control leverage

The arm clamp is controlled or operated through the same lever which controls the operation of the motor, raising and lowering the arm. This lever is indicated at 163 and is best shown in Figures 16 and 17. The lever 163, as well as the remainder of the control levers, is associated with the drill head and projects from the front side thereof. The lever is pivoted on a boss 164 within a control lever casing 165 on a pivot pin 166 and projects forwardly through a vertical slot 167 in the front wall of the control lever casing 165 fixed to the drill head. A link 168 is attached to an intermediate portion of the lever 163 and extends upwardly through the casing. The upper end of the link attached to the outer end of an arm 169 is fixed to the control 170.

The control rod 170 is journalled at the outer end of the arm in the bracket 61 and at the inner end in one wall of the casing 99 in which the connections or couplings of the various rods for transmission of movement to the valve unit 104, are disposed. The end of the rod is pinned to a stub shaft 171 journalled in the aforesaid wall, the inner end of the stub shaft carrying a bifurcated arm 172. The arm 172 is coupled or connected to a bifurcated arm 173 fixed on a shaft 174 journalled in the wall of the casing of the valve unit 104. The valve unit casing is attached to the back of the arm by means of screws 175. The connection between the arms 172 and 173 is a link 176 passing through slots 105 in the back and front walls of the arm. An arm 177 is fixed to the shaft 174 and carries a wrist pin 178 rotatably passing through the intermediate portion of a yoke 179 (see Figure 24). The yoke has its slotted ends engaged in grooves of the valves 180 and 181 arm clamping and elevating respectively.

The control lever 163 for the arm clamp and elevating motor is held in neutral position or position wherein the arm is clamped and the elevating motor is stationary by means of a stabilizing or balancing device comprising opposing spring-urged detent pins 182, 182. These pins engage the opposite sides of the outer end of the arm 169. The pins are mounted in the wall of the casing 165 and include heads 183 limiting their movement toward each other and against the arm 162. Toward this end the heads of the pins are held against the bottom of sockets by means of coil springs 184 held under compression and in place by plugs 185.

Head traverse mechanism

As stated, the head is traversed by the screw 60. The inner end of the screw carries a bevel gear 186 within the juncture box or casing 99. A pinion 187 meshes with this bevel gear 186 and is fixed to a motor shaft 188 journalled in the casing and in the arm. This last named shaft extends from a hydraulic motor 189 fixed to the back of the arm.

As shown in Figure 22, the threads of the screw 60 are engaged by a worm wheel 190, which is normally held in stationary position within the head. A worm 191 fixed on the end of a hand rotated shaft 192 within the head meshes with the teeth of the worm wheel 190. A hand wheel 193 is provided on the last named shaft 192. When the hand wheel is rotated, the worm wheel 190 is rotated and the head is moved manually along the screw. During this manual movement, the threads of the screw function as the teeth of a rack. The worm 191 prevents rotation of the worm wheel 190 when the screw is rotated so the worm wheel is then constituted as a fixed part or stationary nut against which the screw is rotated.

Head traverse control leverage

The hydraulic motor 189 for traversing the head is controlled by means of the lever 194 shown in Figures 16 and 17. This lever 194 is disposed horizontally and projects from the leverage box or casing 165 at the side of the head. It is fixed on the lower extended end of a vertical shaft 195 journalled in the lever box or casing and having a spiral gear segment 196 fixed on its upper end in mesh with the spiral gear 197 keyed to the longitudinal control shaft 198. The rotation of the lever, therefore, rotates the last named control shaft.

For the purpose of maintaining the head traverse lever in neutral position, a balancing device is provided. The hub 199 of the lever includes a flat side providing arms 200. Detent pins 201 engage these arms respectively, one at each side of the center of the vertical shaft (see Figure 20). The detent pins are headed, the heads being contained in counterbores and held against the bottom of the counterbores by coil springs 202 under compression held within the counterbores by plugs 203. A name plate 204 is fixed across the detent carrying member 205 indicating the direction of movement of the head traverse control lever. These detent pins normally lie against the bottom of the sockets constituted by the counterbores and in these positions hold the lever in neutral.

Movement of the lever can take place against one or the other of the detent pins. The detent pin then compressed will act to return the lever against the other detent pin when the lever is released. The control rod is socketed in a stub shaft 206 in the juncture box or casing 99, the stub shaft carrying a bifurcated arm 207 in the casing. This arm is connected to another arm 208 at the side of the valve box or unit 104, by means of a link 209. Another detent arrangement for balancing the arm at neutral is provided with respect to the last mentioned bifurcated arm, the detent pins 210 being mounted in lugs 211 of the valve box and engaging opposite sides of an extension 212 of the arm. The bifurcated arm 209 is fixed on the outer end of the cross shaft 213 of the valve box. The cross shaft 213 carries a valve shifting yoke 214 thereon with the box in connection with the groove of the head traverse control valve 215, which valve is hydraulically connected to the head traverse motor 189, as will be explained later.

Safety nut mechanism

The safety nut 162 is best illustrated in Figures 6 and 27 to 29 inclusive. It consists of a pair of nut segments disposed across a diametric slot 216 in the elevating nut 57. It is free to move vertically or longitudinally of the elevating nut when the threads of the elevating nut become worn (see Figure 28). In other words, relative vertical motion then occurs between the elevating nut 57 and the safety nut 162, so that the safety nut becomes effective for operating a control means on the arm.

Toward the end of transmitting the movement necessary for controlling the hydraulics for discontinuing the elevating motor drive, the following mechanism is provided. A ring or collar 217 encircles the medial cylindrical portion of the elevating nut in the plane of the safety nut and is secured to the safety nut by means of radially disposed screws 218. The inner end of a lever 219, adapted to be displaced, carries a roller 220, which rides upon the collar or ring. The outer end of the lever is pivoted on a pin 221 fixed in a valve carrier bracket 222 attached to the side of the arm. Both the arm and the bracket are appropriately grooved, as at 223, to provide clearance for movement of the lever 219.

A valve unit 224 is supported in this bracket and incorporates a plunger valve 225 slidably mounted in the valve casing, or cylinder 226, the cylinder incorporating suitable heads 227. A screw 228 is adjustably fixed in the lever intermediate its length, and is normally in engagement with a groove 229 at the outer end of the valve stem 230. The valve is urged to a by-pass position, effective for by-passing the oil being delivered to the elevating mechanism and the arm clamp, by means of a coil spring 231 under compression around the valve stem between the inner cylinder head 227 and the body of the valve. The valve is appropriately grooved as at 232 and this groove is associated with ports for circuit purposes, as will be described hereafter. When the inner end of the lever is moved upwardly, due to movement of the safety nut relative to the elevating nut, the screw 228 engaged in the groove is raised clear of the groove and the valve snaps to position of by-pass, the results of which will be more fully apparent in a description of the operation of the hydraulic system which will follow hereafter.

Head clamp mechanism

The head 58 is clamped in position on the rail 240 of the arm 53 by means of a lever 241 fulcrumed on a pin 242 in the lever box, constituted by the plates 93, 94, mounted at the left-hand side of the head (see Figures 3 and 19). The handle end 243 of the lever projects downwardly and outwardly adjacent to the column control lever 91. The inner end of the lever includes a segment of gear teeth 244 engaging with the teeth 245 of a rack 246. The rack extends slidably upwardly in the box and as shown in Figure 3, includes additional teeth 247 at its upper end meshing with gear teeth 248 on a rotatable member 249 screwed into the side of the head. The rotatable member engages against the outer end of a slidable wedge bar 250 disposed crosswise of the head and having its inner end angularly cut and in engagement with the angular end of a second wedging bar 251 extending downwardly and engaging the medial portion of a clamping plate 252 lying against the rail. Thus, movement of the lever in one direction presses the clamping plate against the rail and locks the head in position.

Automatic arm limit stops

Movement of the arm in either direction is limited definitely by a stop arrangement of the following nature: A vertically disposed rod 253 (see Figures 1 and 18) is slidably disposed through the casing 99 and carries contact pads 254, 254 on its upper and lower ends just above and below the upper and lower limits of the arm. These pads are adapted to contact cap 55 and the top flange of the base of the column respectively, and upon contact, to shift the rod in the respective directions. Within the casing the rod 253 traverses a lug portion 255 disposed between a pair of collars 256 and 257 fixed to the rod on opposite sides of the lug portion.

Coil springs 258 under compression are disposed around the rod and lie between the collars and the lug portion, thereby normally maintaining the rod in a balanced position yieldable in either direction. The rod is fixed to the bifurcated arm 172 of the arm clamp and elevating motor control rod 170. The connection consists of a stud 259 screwed into the rod and projecting radially therefrom through a rock pin 260 rotatably supported in an extension 261 of the bifurcated arm. Thus, upon contact of the rod with either the cap or the base of the column, the rod is translated for moving the control mechanism to neutral position. When the control mechanism is moved to position for either raising or lowering the arm, one or the other of the compression springs is compressed since the rod is fixed to the bifurcated arm. Should the operator neglect to discontinue raising or lowering movement of the arm, the mechanism just described will be effective for forcing the control mechanism to a neutral position. Upon release of the lever controlling arm movement the springs tend to return the rod to normal balanced position, and this is effective through the connection to the control lever for further assisting in returning the control lever to neutral.

Fluid pressure supply mechanism

The pump is generally indicated at 265 and is driven from the motor shaft 266 of the motor 62. A transmission casing 267 is fixed to the back of the arm. The motor shaft 266 extends into this casing and is supported in bearings 268 held in the casing by closure caps 269. The shaft carries a pinion 270 within the casing in mesh with a large gear 271 on the end of the drill head transmission shaft 63.

The gear 271 just mentioned is in mesh with a pump driving gear 272 (see Figure 25) having its hubs 273 supported in roller bearings 274 mounted in the casing. The pump shaft 275 is in keyed connection with the last named gear 272 and projects from the pump casing 276. The fluid pump may be of any design and includes an intake conduit 277 extending up from the tank 78. A short pipe connection 278 extends from the pump to a control valve 279 which valve normally, when the system is not in operation, returns the fluid to a tank through the conduit 280. The valve is also effective for directing the fluid through a secondary or vent line incorporated in the system and permitting free circulation when the mechanisms are not being used. This by-pass or vent line is automatically closed when the fluid is used for operation and is effective for closing off the return conduit to the tank, thereupon directing the fluid through the system. The transmission, connecting the motor shaft drive to the pump and to the drill head shaft, the pump, and a release valve are mounted as a unit and have their respective casings secured together, the entire unit being secured to the back of the arm by means of bolts 282.

Hydraulic system

Referring to Figure 30 of the drawings, the pump 265 is diagrammatically shown. As stated, the fluid is drawn to a pump through a conduit 277 from the tank 78. The conduit 277 includes a check valve 285 at its lower end. The tank 78 includes a breather opening 286. The relief or by-pass valve 279 is in connection with the discharge side of the pump by way of pipe 278. The return pipe or by-pass 280 is connected to one end of the valve.

The details of the valve 279 are not fully disclosed, a diagrammatic form of illustration being selected to eliminate the details of this type of valve which is well known. A floating valve 287 is provided within the relief valve. Normally, the fluid being pumped from the tank, holds the headed end of this valve 287 against a seat 288 constituted by a shoulder within the valve bore. The other end of the valve or the reduced end is adapted to seat over the by-pass outlet 289. A coil spring 290 under compression tends to urge the valve toward or against the by-pass outlet seat 289. A port 291 extends through the valve from the surface of the reduced portion, entering into the chamber housing the spring.

A relief valve control conduit 292 extends from this chamber and passes through the various valves eventually returning to the tank. The arrangement is such that, when the pump is operating and none of the valves have been moved to operative position for any of the mechanisms, the fluid passes two ways from the valve, namely, through the by-pass 280 and through the secondary control pipe 292, in both instances returning to the tank. Thus, the pump is not working against full load, unless the mechanism is being operated, no substantial head pressure being created since the fluid is moving back into the tank under only normal pressure of 20–25 lbs., through the pipe 280. The port 291 is small being approximately one sixteenth of an inch in diameter. The vent line or conduit 292 is larger, being approximately one fourth of an inch in diameter. The fluid passing through the line 292 is under about 20–25 lbs. per square inch. Accordingly, when the supply is not being used the electric motor is not being loaded unnecessarily and no horsepower is being taken from the drive to the drill.

The relief valve control pipe or conduit 292 has been arranged with respect to the valves so that movement of any one of the valves to a motor operating position will block this line and cause the pressure in the spring chamber and the pressure within the main valve chamber, or in the pipe 278, to equalize. Thereupon the spring 290 acts to move the valve across to the seat 289 and the fluid then must pass into the main supply pipe 293, leading to the various valves and the head pressure builds up sufficiently for operating any one of the respective motors.

This main supply line 293 connects to the column clamp valve 107 through a pipe 294. As shown in Figure 30, the valve 107 is in clamping position. A lever 91 controlling this valve is held in position by means of the detent 95a (see Figure 19). In this position the fluid passes from the pipe 294 through a groove 295 of the valve to a pipe 296. This latter pipe connects to one end of the column clamp operating motor 82. The piston 81 of the column clamp motor is then forced in column clamping direction.

It will be understood at this point that the column clamp is self-sustaining in each position. That is to say, it is unnecessary to maintain the fluid pressure on either side of the piston 81 to hold the clamp in either clamped or unclamped position. The clamping action has previously occurred and the piston is stationary as shown in Figure 30. In this clamping action, the fluid head is exhausted from the other end of the cylinder through pipe 297, returning to the valve and passing through groove 298, and thence by way of exhaust conduit 299 to the tank.

Associated with the motor 82 (see Figures 7, 9 to 11 inclusive, and 30), is a valve 300. This valve has its stem connected to piston rod 84 of the motor 82 by means of a bar 301. This bar is free to slide upon the valve stem between the shoulders 302 and 303 thereof. When the motor piston is moved to clamping position, as shown in Figure 30, the valve 300 is shifted in the last phase of the piston movement to the position shown in Figure 30.

It will be noted that the relief valve control conduit 292 extends to the valve 107. It has two exits from the valve, namely, 304 and 305, one at each side of the conduit 292. These conduits extend to the reversing valve 300 and pass through the bore thereof at spaced points joining together to continue the pipe 292 thereafter. The valve 107 includes a groove 306 positioned and of a length for connecting the pipe 292 to either conduit 304 or 305.

In the positions shown, the valve 107 has blocked conduit 292 at the beginning of the operation, at which time the groove 307 of the valve 300 is disposed in position for maintaining the conduit 304 in open condition. When the motor piston 81 moves to clamping position, the groove 307 lines up with the sections of the conduit 305. This control conduit is then uninterrupted passing through the respective valves by way of groove 306 and groove 307.

The supply pipe 293 extends to the arm clamping valve 180, by way of two conduits namely, 308 and 309. In Figure 30, the arm clamp is shown in clamped position and due to the interconnection between the valves 180 and 181, the control valves maintain the elevating motor 131 in stationary condition. In this position the arm is clamped since the oil passes to the conduit 309, through the groove 310 of valve 180 and then through conduit 311 to the end of the clamping motor cylinder 130. A control valve 312 for the relief valve control line is associated with the motor 130. This valve is fixed to the piston rod of the motor 130 by means of a bar and must move therewith. In the unclamped position of the arm clamp, the groove 313 of this valve is disaligned from the control pipe 292 where it passes across the bore of the valve. In the clamped position, the groove 313 is aligned with the sections of the pipe 292 and there is no interruption to the flow so that the pump simply by-passes from the conduit 280 back to the tank. This occurs, however, after the clamp has been set.

Due to the fact that the arm clamp is fixed to the elevating mechanism control valve, the valve 180 must have duplicate positions at each side of clamped positions so that unclamping will occur in either direction. Toward this end a groove 315 is provided adjacent groove 310 which will exhaust the end of the motor cylinder 130 in the unclamping operation either by way of conduit 311 or through exhaust conduit 316 or through a branch conduit 317 of conduit 311 through exhaust conduit 316.

The arm clamping motor 130 is exhausted in the clamping operation through conduit 318 leading back to the valve 180, through one of the branches 319, by way of groove 320 and thence through either exhaust branch 321, through conduit 316, back to the tank. Duplicate conduits 319 are provided at either side of the groove 322 which is in connection with the supply conduit 308. It will be seen that when the valve is either shifted to the right or left, supply conduit 308 is connected to the motor 130 through either of the conduits 319 and the unclamping movement of the motor 130 will take place.

Due to the provision of the valves 300 and 312 the pressure does not drop in the system until the motors 82 and 130 have moved to fully clamped or unclamped positions. This is true, even though the levers controlling the main valves 107 and 180 of these motors be released to neutral.

The elevating motor control valve 181 receives the fluid supply by way of pipe 323 which includes an unloader valve 324.

The supply line 323 connects to pipe 318 so as to receive the fluid under pressure for the operation of the elevating motor 131 following the arm unclamping movement. Either of the grooves 325 of valve 323 connects the pipe 183 with the motor 131 through pipes 326 or 327 respectively, depending upon the direction of the movement of the elevating motor desired, that is to say, dependent upon the position of the control lever.

In the position shown in Figure 30, the motor 131 is at rest since the valve has closed off passage 323. The grooves 325 also connect conduits 326 and 327 alternately to exhaust conduits 328 and 329. Accordingly, when the valve 181 is shifted, let us say to the right, the pipe 323 connects to pipe 327 and the motor is then driven. The fluid continues through conduit 326 and conduit 329, through the exhaust line 330 to the tank.

The unloader valve 324 will not allow the fluid to pass through the motor 131 until the arm clamping motor has been operated and has released the arm, and head pressure develops sufficient to unseat the unloader valve. Thus, a delay is provided preventing operation of the elevating motor until the arm clamping motor has functioned. The oil control conduit 292 passes through valve 181 by way of a groove 331 aligned with the conduit when the valve is in neutral position. This groove is essential since, upon the completion of the arm clamping motor stroke, the control passageway will have been reopened (see Figure 30, groove 313). However, the passage of oil through the control passage is still blocked as long as the elevating motor control valve is in either elevating or lowering position.

The arm clamp motor requires approximately 150 lbs. of pressure per square inch for operation. Elevating motors require approximately 800 lbs. of pressure. The valve 324 unloads at slightly above 150 lbs. pressure. This assures operation of the arm clamp motor before the elevating motor receives pressure. The operation of valve 324 is dependent on the difference of pressure and the natural time delays required to operate the arm clamp motor and the elevating motor.

The supply pipe 293 is extended to the head traverse control valve 215, which is a duplicate of the elevating motor control valve so that its passageways are numbered in duplicate. The head traverse motor 189 may be operated slowly or rapidly due to the provision of chamfered edges 335 on that portion of the valve which blocks the supply when the valve is in neutral. In other words, by inching the lever, a variable inlet to the valve is effected. This valve 215 includes the same arrangement for controlling the passage of oil through the control pipe 292 so that the valve is effective for blocking this pipe to supply the necessary fluid pressure to the motor 189 when desired.

*Operation of the various motors*

When the column clamp lever 91 is moved to unclamped position, the valve will assume the position shown in Figure 31. Thereupon, the control conduit 292 is blocked from the condut 305 at the valve. Since the groove 307 is out of line at the beginning of motor operation, pressure is developed. Thereupon, the fluid moves through pipe 294, pipe 297 and the clamp is unclamped. The exhaust takes place through pipe 296, through groove 295 of valve 107 and through exhaust pipe 299 to the tank.

When the column clamp has been unclamped, the flow of oil through the control conduit 292 is reestablished through pipe 304, groove 307 of valve 300, groove 313 of valve 312, and thence to the tank.

The next move the operator makes is to move the arm clamp and elevating motor control lever 163 in either direction dependent upon whether or not the arm is to be raised or lowered. One of these directions is assumed in Figure 31 and the other in Figure 32. Movement of the valve 181 blocks the control conduit 292 since the groove 331 is disaligned. This causes the pump to deliver fluid under pressure through pipe 308, groove 322, through pipe 319, pipe 318, to the motor 130. This moves the motor to unclamping position, the exhaust taking place through conduit 311, branch conduit 317, groove 315 and exhaust pipe 316, back to the tank. As soon as the arm clamping motor has completed its stroke, pressure develops in the line 323 sufficient for unseating the unloader valve, the fluid then passing through the elevating motor control valve by way of groove 325, pipe 327, the motor 131, pipe 326, groove 325, exhaust pipe 328, and the main exhaust pipe 330, back to the tank.

As long as the valve is in the position with its groove 313 disaligned from the control conduit 292, operating pressure is available. When the operator stops the elevating motor by shifting the control lever to neutral, the arm clamping valve will be in position for clamping the arm clamp in the final phase, this being possible since the control valve 312 has still blocked the control pipe 292. The head traverse motor may then be operated for moving the head along the arm, this being done by shifting the lever 194 in either direction, one direction being shown in Figure 31 and the other in Figure 32. As shown in Figure 31, the control conduit 292 is blocked upon the movement of the valve and fluid pressure is available passing through line 293, groove 325, conduit 327, the motor 189, conduit 326, other groove 325, exhaust conduit 328, and the main exhaust conduit 330.

By inching the valve through manipulation of the control lever for positioning the chamfered edges 335 of the valve, the speed of movement of the hydraulic motor of the head may be varied.

*Operation of the safety nut*

When the safety nut operates due to a dangerously worn condition of the threads of the screw 56 and the lever 219 has been lifted to trip the valve 225, the supply line 340 connected to the main supply line 293 is opened to operate a valve 341. This valve 341 is normally held in position with the groove 342 thereof out of alignment with an emergency exhaust passageway 343 by means of a spring 344. When this valve is operated for aligning the groove, the supply line 323 which has been supplying fluid under pressure to the elevating motor is exhausted and elevating movement instantly ceases.

When the operator releases the control lever in neutral position, the arm clamping motor goes into operation and sets the arm clamp in the manner previously described. Thereafter, it is impossible to unclamp the arm due to the fact that the pipe 318 is connected to the exhaust and it is impossible to operate the elevating motor to move the arm up or down due to the fact that the conduit 323 is connected to the exhaust.

Having described our invention, we claim:

1. A hydraulic system for a radial drill or the like, including, a rotatable column, an arm vertically adjustable on the column, a drill head movable along the arm, an arm clamp; a column clamp, an arm elevating mechanism, a head traversing mechanism, hydraulic motors for the clamps and mechanisms, a valve for controlling each motor, a pump for supplying fluid under pressure to said motors through said valves, including a bypassage, a relief valve interposed between the fluid pressure supply means, and the valves, and a control conduit extending from said relief valve through each valve and obstructed by any valve when the valve is moved to motor actuating position, said relief valve seating to block said bypassage and to direct the fluid to the motor controlled by that valve moved to motor actuating position.

2. In a radial drill or the like, a rotatable column and an arm vertically slidably mounted on said column, means for securing the column against rotation, screw means on the column and the arm for raising and lowering the arm, a clamp associated with the arm for securing the arm to the column, hydraulic motors for the arm clamp and screw means respectively, a fluid supply means for delivering fluid under pressure to said motors, manually operated control valves for controlling said motors, a single lever for operating said valves, a supply conduit extending from the arm clamp motor to the arm elevating motor, said supply conduit including an unloader valve preventing the application of fluid pressure to the elevating motor until the arm clamping motor has been operated and pressure has developed sufficient to operate the unloader valve.

3. In a radial drill, a column, an arm adapted to be raised and lowered on said column and to be clamped thereto, a screw associated with the column, an elevating nut associated with the arm, hydraulic means for causing relative rotation between said nut and screw, a control valve for said hydraulic means, a safety valve associated with said nut and adapted to be tripped in the event that the threads of the nut become worn, said safety valve connected to said hydraulic means for exhausting the same for automatically discontinuing the operation of the hydraulic means in said event.

4. In a radial drill, including, the column, the arm vertically adjustably mounted on said column, the base for rotatably supporting the column, clamps for securing the arm to the column and the column to the base respectively, either one or both of said clamps including a draw bolt and wedging means therefor, said wedging means immovable from the draw bolts and therefore locked in either clamped or unclamped position, a hydraulically actuated piston for operating said wedging means for moving it to one or the other position, and means for controlling said piston movement.

5. In a radial drill, a column, an arm adapted to be raised and lowered on said column and to be clamped thereto, a screw associated with the column, an elevating nut associated with the arm, hydraulic means for causing relative rotation between said nut and screw, a control valve for said hydraulic means, a safety valve connected to said elevating nut and adapted to be tripped when there is a predetermined directly axial movement between the screw and the elevating nut, said safety valve connected to said hydraulic means for exhausting the same for automatically discontinuing the operation of the hydraulic means in the event there is predetermined relative movement between the screw and the elevating nut.

6. In a radial drill or the like, a column, an arm vertically slidably mounted on said column, a screw on the column extending through the arm for raising and lowering the arm, a nut in the arm engaging the screw, a clamp associated with the arm for securing the arm to the column, a hydraulic motor for said elevating nut, a hydraulic motor for the arm clamp, a fluid supply means for delivering fluid under pressure to said motors, control valves for said motors, a single lever for operating said valves, and a device interposed between the motors for delaying the operation of the elevating nut motor until the arm clamp motor has operated.

7. In a radial drill, a column, an arm adapted to be raised and lowered on said column and to be clamped thereto, an arm clamp for securing the arm to the column, a screw associated with the column, an elevating nut associated with the arm, hydraulic means for causing relative rotation between said nut and screw, hydraulic means for operating said arm clamp, control valves for said hydraulic means, a safety nut associated with said elevating nut, a safety valve connected to said safety nut and adapted to be tripped when there is relative movement between the safety nut and the elevating nut, said safety valve connected to said hydraulic means for exhausting the same for automatically by-passing the hydraulic means for preventing operation of either motor for movement of the arm or unclamping of the arm clamp.

8. A hydraulic system for a radial drill of the type including, a rotatable column having an arm translatable on the column, means for clamping the arm to the column, and means for raising and lowering the arm along the column; a hydraulic motor for driving the elevating means, a hydraulic motor for moving the arm clamp from operative to unoperative position or vice versa, control valves for the respective motors, a pump for supplying fluid under pressure to said motors through said valves, a relief valve interposed between the fluid pressure supply means and the control valves, said relief valve including conduit means for directing the fluid either back to the tank, through conduits to the valves or, through a relief valve control conduit, said last named conduit passing through each of said control valves, said relief valve including, an element unseated by the development of pressure in the relief valve conduit when either of the valves is moved to operative position, said element in the relief valve seating for blocking return passage to the tank and to permit the flow of fluid through said conduits to the control valves.

9. In a radial drill the combination with a stump, a column rotatably mounted on said stump, an arm slidably mounted on said column, a head translatably mounted on said arm, a clamp for securing said arm to said column, a screw mounted in said column and traversing the arm for raising and lowering the same, and means for traversing the head on the arm, of: hydraulic motors for operating said clamp, said arm raising and lowering mechanism, and said head traversing mechanism, and a fluid system for operating said motors, including constantly driven fluid pressure supply means.

10. In a hydraulic control system for radial drills, a fluid pump, a pressure conduit in connection with a hydraulic normally clamped arm clamp motor and a hydraulic arm elevating motor, a manually operated control valve in said pressure conduit and exhaust conduits from said motors to said reservoir, a stationary elevating screw, an elevating nut in driving connection with said elevating motor, a safety nut associated with said elevating nut for unitary rotation and relative axial movement, a spring actuated normally closed trip valve in fixed relation to said elevating nut and having a trip lever in connection with said safety nut, a by-pass conduit in connection across said pressure and exhaust lines through said normally closed valve whereby in the event of excessive wear of the threads of the elevating nut, said hydraulic motors are rendered inoperative.

11. A control and operating system for radial drills comprising, a hydraulic arm elevating motor, a hydraulic arm clamping and unclamping motor, a hydraulic column clamping and unclamping motor, a hydraulic head traverse motor, a centralized control valve unit including a plurality of valve plungers, a pair of conduits in connection with each of said hydraulic motors and a respective valve plunger, a fluid pump, a reservoir, a pressure line and an exhaust line in connection with said control valve, said fluid pump, and said reservoir, means for selectively actuating the plungers in connection with the head traversing motor and column clamping motors respectively, and means for simultaneously actuating the plungers in connection with the arm elevating motor and arm clamping motor.

12. In a hydraulic control system for radial drills, including an arm, a column slidably adjustably supporting the arm, a fluid pump, a pressure conduit, a hydraulic arm elevating motor supplied from said pressure conduit, a manually operated control valve in said pressure line, an exhaust conduit from said motor to said reservoir, a stationary elevating screw, an elevating nut in driving connection with said elevating motor, a safety nut associated with said elevating nut for unitary rotation and relative axial movement, a normally closed valve in fixed relation to said elevating nut and having a trip lever in connection with said safety nut, a bypass conduit in connection across said pressure conduit through said normally closed valve, whereby in the event of excessive wear of the threads of the elevating nut, said valve is tripped and said hydraulic motor is rendered inoperative.

13. In a radial drill including the rotatable column, the arm and the head; a control and operating system including, a hydraulic arm elevating motor, a hydraulic arm motor clamp, a hydraulic column clamp motor and a hydraulic motor for traversing the head, a centralized control valve unit mounted on said arm, a hydraulic pump and a reservoir mounted on said arm, a pressure conduit from said pump to said control valve unit, a plurality of branch lines from said valve unit to said hydraulic motors, a plurality of control rods disposed and journalled parallel to said arm, operating linkage connecting the control rods to a plurality of valve plungers of the centralized control valve unit, and a plurality of control levers mounted on the head and slidably non-rotatably traversed by said rods.

14. In a radial drill including a base, a column, an arm and a longitudinally translatable head; a plurality of control shafts each having a keyway, said shafts extending parallel to the arm, a control unit at the column supporting adjacent ends of the shafts, a bearing bracket supporting the other ends, a plurality of control levers, a housing secured to the head carrying said levers and including connecting means for the levers slidably and non-rotatably engaged on said shafts.

15. In a radial drill having a column and a translatable arm, said arm having a slotted bore encircling said column, and means for contracting said bore to clamp said arm to the column comprising; a pair of flanges adjacent each side of said slot, a draw bolt traversing said flanges and having its headed end engaged in one of said flanges and its opposite end pivoted in a lever fulcrumed on the second of said flanges, said fulcrumed lever having a roller at its opposite end, a floating roller engaged against said roller and against an axially sustained roller, an inclined cam deposed adjacent said floating roller adapted to wedge said floating roller between said axially sustained roller and the fulcrumed lever roller.

16. An arm clamp for a radial drill comprising, a housing, a translatable rod having a wedging cam at one end thereof, means for translating said rod, a pair of floating rollers in said housing in operating engagement on opposite sides of said cam, a pair of rollers journalled in said housing, a pair of oppositely disposed clamping levers carrying rollers at their inner ends, one of each of said rollers on the levers being adjacent one of each of said journalled rollers and each spaced therefrom a distance substantially less than the diameter of said floating rollers, said floating rollers being disposed between the cam and in contact with said journalled rollers, and said clamp lever rollers on each side of said cam adapted to be forced therebetween for clamping pressure on actuation of said wedging cam.

17. In a radial drill, a column, an arm, an elevating screw, a hydraulically driven elevating nut in threaded engagement with said elevating screw and in load sustaining relationship with said arm, a secondary nut associated with the first for unitary rotation and relative axial movement and relieved of the load of the arm, a trip valve fixed to said arm having a trip element associated with said secondary nut, said trip valve including hydraulic leads controlling the hydraulic drive for the nut adapted to prevent operation of said hydraulically driven nut when the threads of the nut reach a predetermined degree of wear.

18. In a column clamp motor for a radial drill, including the clamping mechanism, a hydraulic piston and cylinder, said piston having a rod connected to an operating link of the clamping mechanism, a main valve, a pressure supply control valve associated with said piston and cylinder, actuating means for transmitting the movements of said piston rod to said control valve, hydraulic conduits in connection with said control valve, said cylinder, and said main valve, said control valve including vent connections which are open when the piston is at either end of its stroke, and said main valve including ports closing the vent connections when the main valve is moved to operating position.

19. In a radial drill including the rotatable column, the arm and the head; a control and operating system consisting of, a hydraulic arm elevating motor, a hydraulic arm motor clamp, a hydraulic column clamp motor and a hydraulic motor for traversing the head, a centralized control valve unit including a control plunger for each motor, a hydraulic pump and a reservoir, a pressure conduit from said pump to said control valve, a plurality of branch lines to said hydraulic motors, and a plurality of control levers mounted on the head and respectively connected to said motors.

20. In a radial drill including, a column, an arm vertically adjustable on the column, a head mounted on the arm, a screw disposed along the arm and traversing the head, said screw including gearing at one end, a hydraulic motor shaft disposed transversely of the arm, a hydraulic motor fixed to one side of the arm, means for operating said motor including a control valve and a lever on the head connected to said valve.

21. In a radial drill, a column, an arm vertically adjustable on the column, a screw disposed along the column and traversing the arm, a hydraulically driven elevating nut in the arm in engagement with the screw, a control means for said hydraulically driven elevating nut, a safety valve connected to said control and disposed in engagement with a trip lever, a safety nut in the elevating nut having vertical clearance therein for relative movement when the elevating nut threads become worn, said relative movement adapted to trip the safety valve and render the elevating nut driving means inoperative.

22. In a radial drill including the column, the arm vertically adjustable thereon, and a head mounted on the arm; a screw disposed along the arm and traversing the head, a hydraulic motor fixed on the arm and connected to the screw, means for operating said motor including a control valve, and a lever on the head connected to said valve for controlling the motor.

23. In a radial drill, a column, an arm vertically adjustable on the column, a screw for elevating said arm, a hydraulically driven elevating nut in the arm in engagement with the screw, control means for said hydraulically driven elevating nut, a safety valve connected to said control means and in operative relationship with said elevating nut, and means within the nut for tripping the safety valve for bypassing the fluid supply of the hydraulic drive for the safety nut.

24. In a radial drill the combination with a rotatable column, an arm vertically slidable on the column and a head translatable on the arm, of a fluid motor for clamping the arm, means for elevating and lowering the arm, a fluid motor for causing operation of said means, pump means forming a common source of pressure fluid for operating said motors, valve means for controlling the supply of fluid to said motors, means for by-passing the pump means when said valve means are closed to all motors and means controlled by the clamping motor for preventing such by-passing when the arm is not clamped.

25. In a radial drill the combination with a rotatable column, an arm vertically slidable on the column and a head translatable on the arm, of a fluid motor for clamping the column, a fluid motor for clamping the arm, means for elevating and lowering the arm, a fluid motor for causing operation of said means, pump means forming a common source of pressure fluid for operating said motors, valve means for controlling the supply of fluid to said motors, means for by-passing the pump means when said valve means are closed to all motors, and means controlled by the column clamping motor for rendering the by-passing means effective at the end of a stroke of the column clamping motor while that motor remains connected to the pump means.

26. In a radial drill the combination with a rotatable column, an arm vertically slidable on the column and a head translatable on the arm, of a fluid motor for clamping the column, a fluid motor for clamping the arm, means for elevating and lowering the arm, a fluid motor for causing operation of said means, means for traversing the head on the arm, a fluid motor for causing operation of the last said means, pump means forming a common source of pressure fluid for operating said motors and a combined control panel structure for controlling said motors, said panel structure including a manually operable control valve individual to each motor.

27. In a radial drill the combination with a rotatable column, an arm vertically slidable on the column and a head translatable on the arm, of a fluid motor for clamping the column, a fluid motor for clamping the arm, means for elevating and lowering the arm, a fluid motor for causing operation of said means, pump means forming a common source of pressure fluid for operating said motors and a combined control panel structure for controlling said motors, said panel structure including a manually operable control valve individual to each motor, valve means for by-passing the pump means and means in said panel structure for rendering the by-passing means ineffective whenever any one of said control valves is moved to direct fluid to its corresponding motor.

CARL E. LINDEN.
RAYMOND H. McCLELLAN.